(12) United States Patent
Sulchek et al.

(10) Patent No.: US 8,214,917 B2
(45) Date of Patent: Jul. 3, 2012

(54) MOLDED MICROFLUIDIC FLUID CELL FOR ATOMIC FORCE MICROSCOPY

(75) Inventors: Todd A. Sulchek, Atlanta, GA (US); Siping Roger Qiu, Livermore, CA (US); Damien J. Noga, Atlanta, GA (US); David K. Schoenwald, Douglasville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 221 days.

(21) Appl. No.: 12/790,513

(22) Filed: May 28, 2010

(65) Prior Publication Data

US 2010/0306887 A1 Dec. 2, 2010

Related U.S. Application Data (60) Provisional application No. 61/182,165, filed on May 29, 2009.

(51) Int. Cl.
*G01Q 30/20* (2010.01)
*B28B 11/00* (2006.01)

(52) U.S. Cl. ............ 850/18; 850/40; 850/48; 850/52; 250/310

(58) Field of Classification Search .......... 850/1–3, 850/18, 33, 40, 45, 48, 52, 53, 60; 250/306, 250/307, 310, 526
See application file for complete search history.

(56) References Cited

U.S. PATENT DOCUMENTS

| | | | |
|---|---|---|---|
| 4,100,068 A | 7/1978 | Jordan et al. | |
| 4,922,758 A * | 5/1990 | Penny | 73/38 |
| 4,935,634 A | 6/1990 | Hansma et al. | |
| 5,215,926 A | 6/1993 | Etchells, III et al. | |
| 5,240,856 A | 8/1993 | Goffe et al. | |
| RE34,489 E | 12/1993 | Hansma et al. | |
| 5,291,775 A | 3/1994 | Gamble et al. | |
| 5,486,457 A | 1/1996 | Butler et al. | |
| 5,750,989 A | 5/1998 | Lindsay et al. | |
| 5,939,319 A | 8/1999 | Hlavinka et al. | |
| 6,043,066 A | 3/2000 | Mangano et al. | |
| 6,454,924 B2 | 9/2002 | Jedrzejewski et al. | |
| 6,478,969 B2 | 11/2002 | Brantley et al. | |
| 6,595,232 B2 | 7/2003 | Guzman et al. | |
| 6,631,648 B2 | 10/2003 | Lai et al. | |
| 7,260,980 B2 * | 8/2007 | Adams et al. | 73/31.05 |
| 2005/0121615 A1 | 6/2005 | Prater et al. | |
| 2008/0044312 A1 * | 2/2008 | Malito et al. | 422/68.1 |
| 2010/0267164 A1 * | 10/2010 | Adams et al. | 436/183 |

* cited by examiner

*Primary Examiner* — Bernard E Souw (74) *Attorney, Agent, or Firm* — Bryan W. Bockhop; Bockhop & Associates, LLC (57) ABSTRACT

A microfluidic cell includes a compressible block and a cantilever. The compressible block includes a first horizontal surface, an opposite second horizontal surface and a plurality of vertical surfaces therebetween. A gasket structure depends downwardly from the second horizontal surface. The gasket structure defines an open cavity therein. The compressible block defines a fluid inlet passage and a fluid outlet passage each in fluid communication with the cavity and opening to a selected one of the first horizontal surface and one of the plurality of vertical surfaces. The cantilever includes body portion and a beam extending laterally therefrom. The body portion is embedded in the compressible block and a portion of the beam extends into the cavity defined by the gasket structure.

23 Claims, 5 Drawing Sheets

MOLDED MICROFLUIDIC FLUID CELL FOR ATOMIC FORCE MICROSCOPY

CROSS-REFERENCE TO RELATED APPLICATION(S)

This application claims the benefit of U.S. Provisional Patent Application Ser. No. 61/182,165, filed May 29, 2009, the entirety of which is hereby incorporated herein by reference.

BACKGROUND OF THE INVENTION

1. Field of the Invention

The present invention relates to microfluidic systems and, more specifically, to a microfluidic system used in atomic force microscopy.

2. Description of the Related Art

Atomic force microscope (AFM) is used by researchers to image surfaces with nanometer lateral resolution and sub-nanometer height resolution. In addition, high resolution imaging can be performed in physiological environments, which include liquids and physiological buffers. Imaging in an enclosed physiological environment is typically accomplished with a "liquid cell," which can be built in house or obtained commercially. A liquid cell secures the probe of an atomic force microscope and positions the microcantilever tip at the surface to be imaged while maintaining an enclosed and sealed environment containing a small volume of liquid, which can typically be pumped or heated.

However, current systems place the liquids to be imaged in relatively large volumes, thereby making specific molecules difficult to find with the probe. Commercially available liquid cells enclose a volume of liquid using an O-ring gasket that measures approximately one centimeter in diameter or larger and typically enclose a volume of 50 microliters to several milliliters.

For many applications of the AFM, this relatively large volume of liquid is a major drawback. This is because many proteins and other biomaterials are difficult to obtain in large quantities and prolonged imaging assays can only be conducted at very low concentrations of material. As a result, the study of the dynamics of crystal growth by proteins during biomineralization processes is limited by the capability of today's AFM liquid cells. Also current liquid cell designs contain significant "dead volume" in which a reagent pumped to the sample does not distribute uniformly as a consequence of expanding flow lines from the inlet via through the flow cell. A more well-defined flow field would allow a clear interpretation of real-time in situ AFM measurements of kinetic processes.

Typical cells used in AFM imaging include transparent materials to allow the monitoring of cantilever deflection optically and are able to hold the cantilever probe die firmly in place. They also enclose the cantilever in a liquid-tight seal and allow the cantilever tip access to the surface of a sample during imaging or force spectroscopy. Many liquid cells are machined from quartz or plastic with a metal spring that holds the cantilever die in place. A recessed O-ring seals against the sample surface and defines the liquid microenvironment.

Shrinking the flow channel is stymied by the need to enclose both the cantilever, which is microscopic, and the substrate die, which is macroscopic having lengths in millimeters on two dimensions. Many existing liquid cell designs have a macroscopic gasket, which surrounds the entire probe including the cantilever and substrate die.

Therefore, there is a need for a microfluidic cell for use in AFM that maintains a micro-scale volume of liquid near the sensing probe.

SUMMARY OF THE INVENTION

The disadvantages of the prior art are overcome by the present invention which, in one aspect, is a microfluidic cell that includes a compressible block and a cantilever. The compressible block includes a first horizontal surface, an opposite second horizontal surface and a plurality of vertical surfaces therebetween. A gasket structure depends downwardly from the second horizontal surface. The gasket structure defines an open cavity therein. The compressible block defines a fluid inlet passage and a fluid outlet passage each in fluid communication with the cavity and opening to a selected one of the first horizontal surface and one of the plurality of vertical surfaces. The cantilever includes body portion and a beam extending laterally therefrom. The body portion is embedded in the compressible block and a portion of the beam extends into the cavity defined by the gasket structure.

In another aspect, the invention is a microfluidic cell that includes a compressible block and a cantilever. The compressible block includes a gas permeable polymer and includes a first horizontal surface and an opposite second horizontal surface and a plurality of vertical surfaces therebetween. A gasket structure depends downwardly from the second horizontal surface. The gasket structure defines an open cavity therein. The compressible block defines a fluid inlet passage and a fluid outlet passage each in fluid communication with the cavity and opening to a selected one of the first horizontal surface and one of the plurality of vertical surfaces. The gas permeable polymer includes a material that is transparent to a preselected wavelength of electromagnetic energy selected to illuminate a surface of the cantilever by an atomic force microscopy apparatus. The cantilever includes a body portion and a beam extending laterally therefrom. The body portion is embedded in the compressible block and a portion of the beam extends into the cavity defined by the gasket structure.

In yet another aspect, the invention is a method of making a microfluidic cell in which a gas permeable polymer is placed into a mold that defines a void that is complimentary in shape to a compressible block so that the compressible block includes a first horizontal surface and an opposite second horizontal surface and a plurality of vertical surfaces therebetween, a gasket structure depending downwardly from the second horizontal surface so that the gasket structure defines an open cavity therein. Also so that the compressible block defines a fluid inlet passage and a fluid outlet passage each in fluid communication with the cavity and opening to a selected one of the first horizontal surface and one of the plurality of vertical surfaces. The flexible polymer is removed from the mold so as to define the compressible block. A cantilever is inserted into the compressible block. The cantilever includes a body portion and a beam extending laterally therefrom. The cantilever is inserted so that the body portion is embedded in the compressible block and a portion of the beam extends into the cavity defined by the gasket structure.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1A:
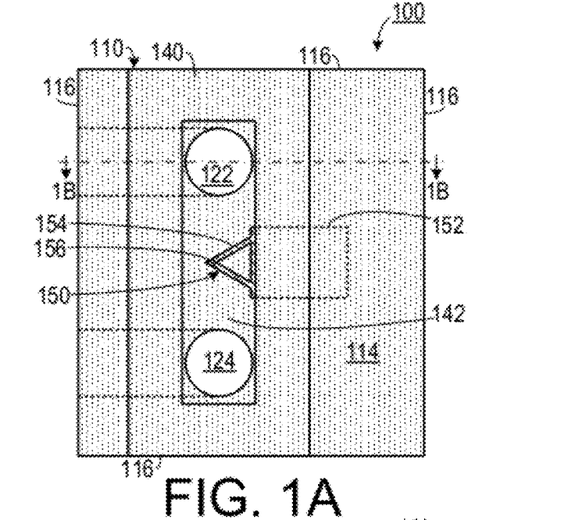
FIG. 1A is a bottom plan view of a first representative embodiment of a microfluidic cell.
Figure 1B:
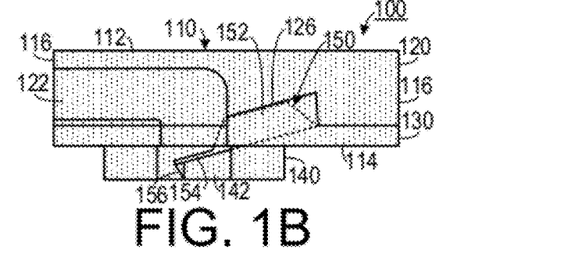
FIG. 1B is a cross-sectional view of the microfluidic cell shown in FIG. 1A taken along line 1B-1B.

As shown in FIGS. 1A-1B, one embodiment is a microfluidic cell 100 for use in atomic force microscopy that includes a compressible block 110. The compressible block includes a first horizontal surface 112 and an opposite second horizontal surface 114. A plurality of vertical surfaces 116 are disposed therebetween. A gasket structure 140 extends downwardly from the second horizontal surface 114 and defines a cavity 142 therein. The compressible block 110 also defines a fluid inlet passage 122 and a fluid outlet passage 124 that are each in fluid communication with the cavity 142 and that open to a selected one of the first horizontal surface 112 and one of the plurality of vertical surfaces 116. A cantilever 150 includes a body portion 152 and a beam 154 extending laterally therefrom. The body portion 152 is embedded in the compressible block 110 and a portion of the beam 154 extends into the cavity 142. In certain embodiments, a probe tip 156 extends downwardly from the distal end of the beam 154. Other embodiments do not employ a probe tip.

In certain embodiments, the compressible block 110 is made from a gas permeable polymer, such as poly(dimethylsiloxane) ("PDMS"). PDMS works well in AFM applications, as it is transparent to the wavelengths of electromagnetic energy used with existing AFM systems to illuminate the beam 154 of the cantilever 150.

The embodiment shown in FIGS. 1A-1B includes three layers of PDMS. The first layer 120 has a first side that defines an indentation 126 that is configured to receive a first portion of the cantilever 150 therein. A second layer 130 is disposed on the first side of the first layer 120 and embeds a second portion of the cantilever 150. A third layer (a gasket layer) is disposed on a second side of the second layer and defines the gasket structure 140.

Figure 2A:
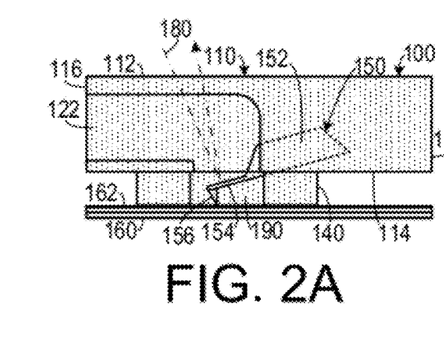
FIG. 2A is a cross sectional view of a microfluidic cell applied to an imaging surface in an uncompressed mode.

As shown in FIG. 2A, the microfluidic cell 100 can be used to image an imaging surface 162 by placing the gasket structure 140 against the imaging surface 162, which may be supported by a rigid substrate 160, and injecting a fluid through the fluid inlet passage 122. Thus, the cavity 142 and the imaging surface 162 form a sample chamber 190 for holding the fluid of interest.

The imaging surface 162 can include a material to be imaged. For example, organic cells of interest can be applied to the imaging surface 162 and the cantilever 150 can be used to image the cells as they interact with the fluid. In another example, the imaging surface 162 can be functionalized with a compound of interest and the fluid can interact with the compound during the imaging process.

Figure 2B:
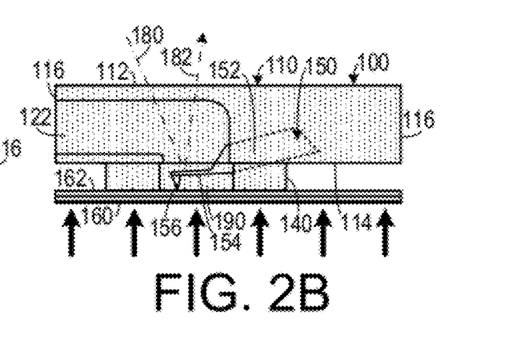
FIG. 2B is a cross sectional view of the microfluidic cell shown in FIG. 2A applied to an imaging surface in a compressed mode.

In one embodiment, a beam of electromagnetic radiation 180 is reflected off of the cantilever 150 while the compressible block 110 is compressed, causing the probe 156 to engage the imaging surface 162. Properties of the reflected beam 182 (such as its displacement) can be used to provide imaging or other information about the imaging surface. In the example shown in FIG. 2B, the block 110 is compressed by driving the imaging surface 162 upwardly against the block 110 in the direction of the arrows. Lateral displacement of the cantilever 150 can be accomplished by compressing the block 110 is a lateral direction.

Figure 3A:
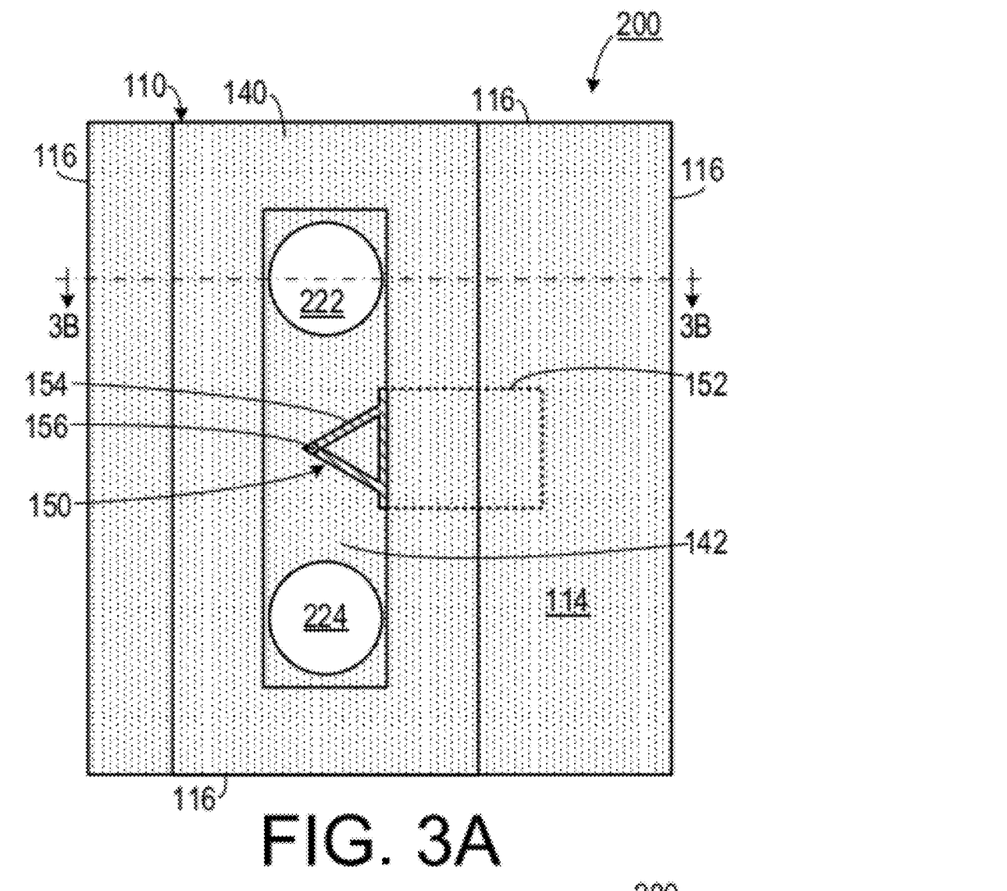
FIG. 3A is a bottom plan view of a second representative embodiment of a microfluidic cell.
Figure 3B:
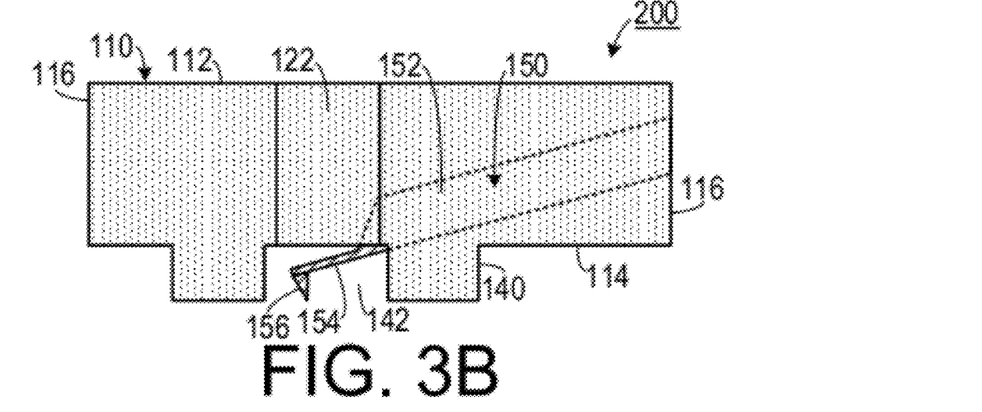
FIG. 3B is a cross-sectional view of the microfluidic cell shown in FIG. 3A taken along line 3B-3B.
Figure 4A:
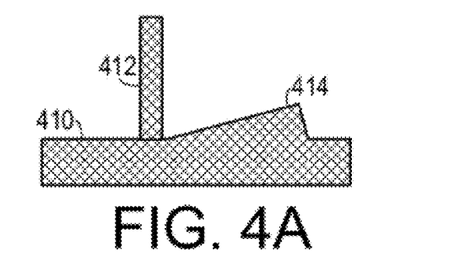
FIGS. 4A-4H are a series of schematic drawings demonstrating a first method of making a microfluidic cell.
Figure 4B:
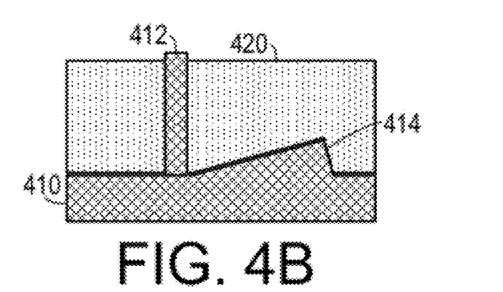
Figure 4C:
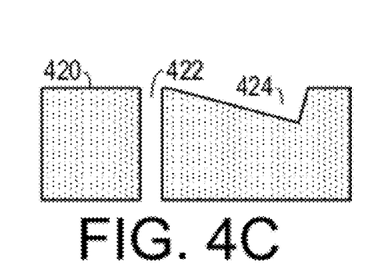
Figure 4D:
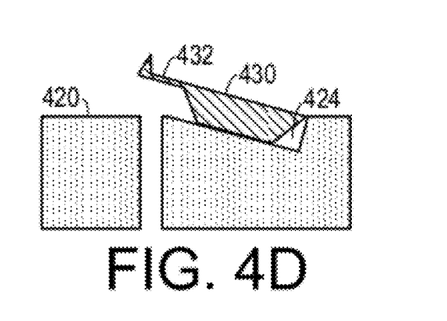
Figure 4E:
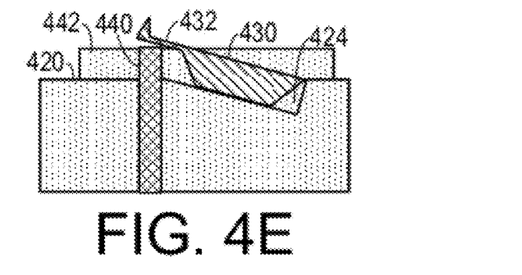
Figure 4F:
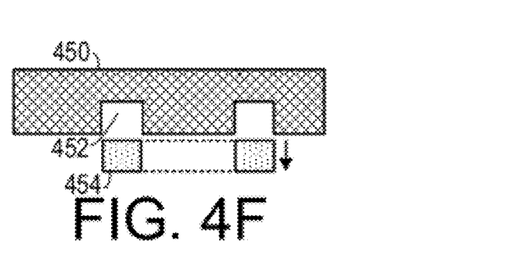
Figure 4G:
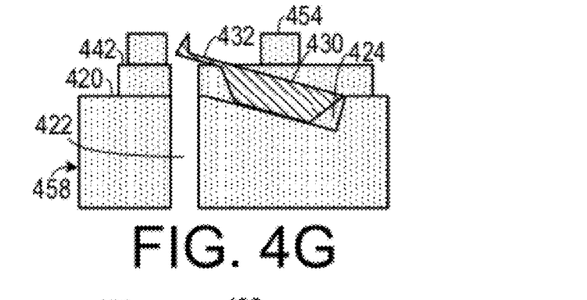
Figure 4H:
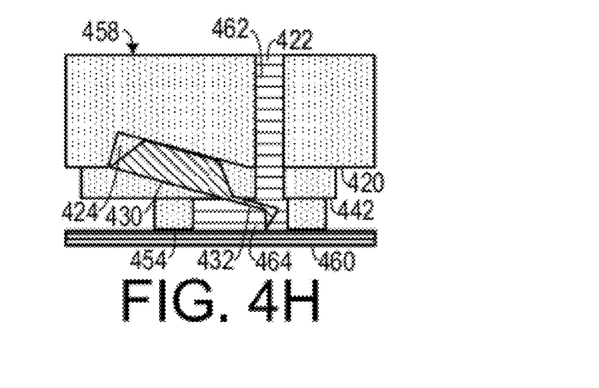
Figure 5A:
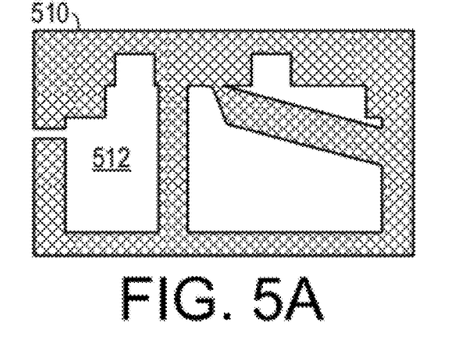
FIGS. 5A-5D are a series of schematic drawings demonstrating a second method of making a microfluidic cell.
Figure 5B:
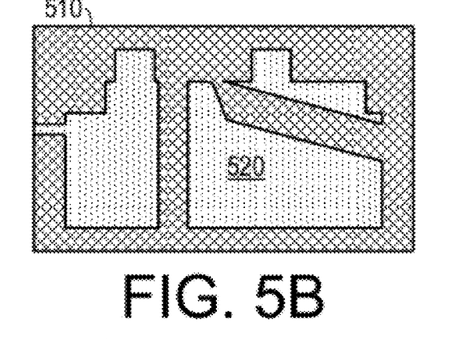
Figure 5C:
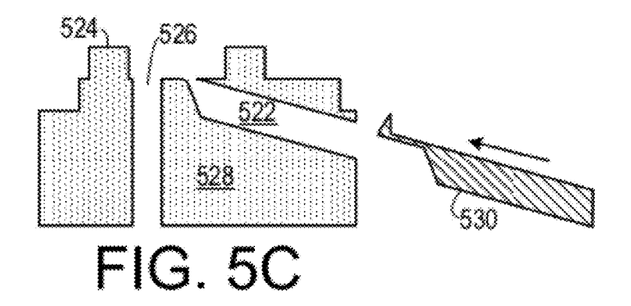
Figure 5D:
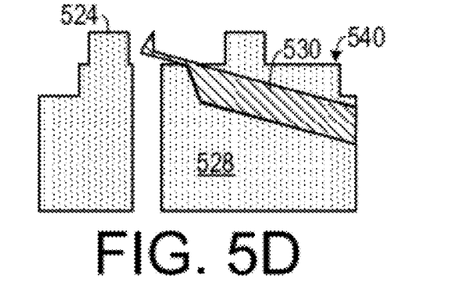

An embodiment on a microfluidic cell 200, in which the compressible block 110 comprises a unitary piece of a material, is shown in FIGS. 3A and 3B. Also, in this embodiment, the fluid inlet passage 222 and the fluid outlet passage 224 extend upwardly from the cavity 142 to open to the top horizontal surface 112 of the block 110.

One method of making a microfluidic cell is shown in FIGS. 4A-4H, in which a mold 410 is formed on a rigid material (e.g., a silicon crystal) using, e.g., existing photolithographic techniques. The mold 410 includes a feature 414 that is complementary in shape to an indentation 424 for holding a cantilever 430 therein. The mold 410 also includes two posts (a first post 412 and a second post, the view of which is obscured by the first post 412 in this figure) that correspond to the fluid inlet 422 and the fluid outlet.

A polymer (such as PDMS) is applied to the mold, thereby rendering a cast of the first layer of the block 420. The polymer is cured and the removed, thereby rendering a cast of the first layer of the block 420.

A cantilever 430 is placed into the indentation 424 and rods 440 corresponding to the fluid inlet passage 422 and the fluid outlet passage are placed in the block 420. A second layer 442 of polymer is applied to the first layer of the block 420 to embed the cantilever 430, but not cover at least a portion of the beam 432 of the cantilever 430.

Separately, a second mold 450 defines an void 452 in the shape of the gasket structure 454. Polymer is placed into the void 452, cured and the gasket structure 454 is removed from the mold 450. The gasket structure 454 is then applied to the second layer 442, thereby forming the microfluidic cell 458. The microfluidic cell 458 may then be placed against the imaging surface 460 and the fluid of interest 462 can be injected through the fluid inlet 422 into the sample chamber 464.

In another embodiment, as shown in FIGS. 5A-5D, the block 528 can be made as a single unitary structure. In this embodiment, a mold 510 is made so as to be complimentary in shape to the block 528. A polymer 520 is injected into the mold 510, cured and the resulting block 528 is removed from the mold 510. The mold 510 is shaped so as to include a slit 522 into which a cantilever 530 can be slid. The mold 510 also has a void complimentary to the gasket structure 524. Once the block 528 is removed from the mold 510, the cantilever 530 is slid into place and the resulting microfluidic cell 540 is ready for use.

Figure 6:
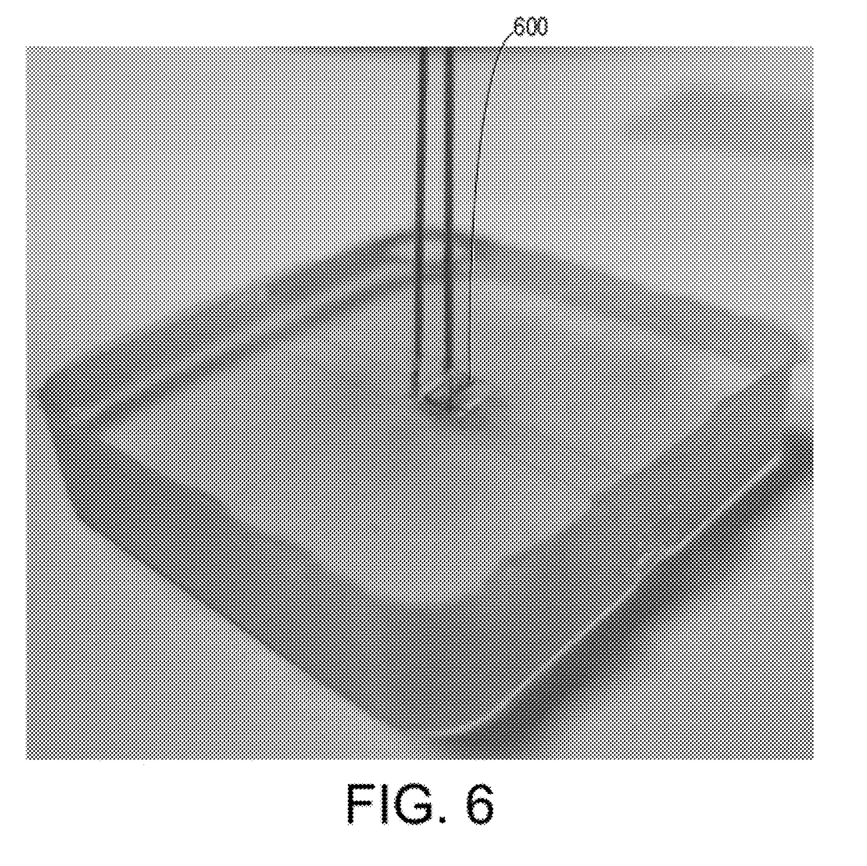
FIG. 6 is a photograph of one experimental embodiment of a microfluidic cell.

A photograph of a microfluidic cell 600 of the type disclosed herein is shown in FIG. 6.

The microfluidic liquid cells disclosed herein are capable of high-resolution atomic force microscope (AFM) imaging and force spectroscopy. In one experimental embodiment, a microfluidic liquid cell was assembled from three molded poly(dimethylsiloxane) (PDMS) pieces and integrated with commercially purchased probes. The AFM probe was embedded within the assembly such that the cantilever and tip protrude into the microfluidic channel. This channel is defined by the PDMS assembly on the top, a PDMS gasket on all four sides, and the sample substrate on the bottom, forming a liquid-tight seal. This design features a low volume fluidic channel on the order of 50 nL, which is a reduction of over 3-5 orders of magnitude compared to several existing liquid cells. This device facilitates testing at high shear rates and laminar flow conditions coupled with full AFM functionality in microfluidic aqueous environments, including execution of both force displacement curves and high resolution imaging.

The AFM probe was embedded into the flow cell so that the cantilever and tip protruded into the microfluidic channel. This channel was defined by the PDMS assembly on the top, a PDMS gasket on all four sides, and the sample substrate on the bottom, forming a liquid-tight seal. This design allows for much smaller enclosed liquid volumes than conventional cells. By precisely aligning the cantilever within the microchannel, the volume surrounding the cantilever is reduced by three orders of magnitude or more. In addition, using PDMS, a material permeable to gas, eliminated air bubble formation that is commonly found with commercially available liquid cells. Such bubbles can form quite readily especially for experiments run at physiological temperature and can quickly clog microfluidic flow and impede imaging In the experimental embodiment, the microfluidic liquid cell was formed from three molded poly(dimethylsiloxane) (PDMS) parts, each assembled was aided by a long working-distance microscope (available Nikon). The cell was designed for use in the Multimode AFM (such as an AFM available from Veeco Metrology). The parts of the cell were formed by pouring uncured PDMS (Sylgard® 184 Silicone elastomer kit, available from Dow Corning) into a custom designed polycarbonate mold. A 13 degree ramp was milled into the polycarbonate mold. This produced a die shaped recess in the cured PDMS with a precise fit and angle for the AFM probe. The polycarbonate mold also provided a method to define inlet and outlet vias to either side of the cantilever. These vias were defined by 100 micron diameter Teflon tubing (available from Upchurch). The tubing was inserted into two holes drilled into the polycarbonate mold on each side of the ramp.

Uncured PDMS was mixed thoroughly with a ratio of 10:1 elastomer to curing agent and degassed under vacuum for 30 minutes to remove air bubbles. The PDMS was injected via a syringe into the mold and then cured in an oven at 60° C. for one hour. The thickness of the first part (Part 1) was determined by a three dimensional Plexiglas box surrounding the polycarbonate mold to contain the injected PDMS. Four identical parts were made from each mold. The parts were then cut apart with a razor blade. Each assembled liquid cell had outer dimensions of 3 cm×4 cm×1 cm. To interface pumped liquid seamlessly into the liquid cell vias, metal inserts were created. The metal inserts molded voids matching the outer diameter of the 234 um outer diameter glass tubing (available from Upchurch).

The cured first part was then removed from the mold and the interior tubing was removed to leave vias. A cantilever chip (e.g., NTESP, available from Veeco Probes) was secured into the recess with a drop of PDMS. The chip included four v-shaped $Si_3N_4$ cantilevers ranging in length from 85 µm to 320 µm.

A second molded PDMS component (Part 2) was added next. Part 2 surrounded the cantilever die on four sides and provided a uniform platform upon to which the gasket was secured. The thickness of Part 2 was designed to be slightly smaller than the distance from the top of Part 1 to the base of the cantilever, as measured using optical microscopy. Part 2 was adhered to Part 1 with uncured PDMS which seeped into the air gap between the two PDMS pieces and was cured to secure into place.

The third molded PDMS piece was the gasket, which formed the microfluidic channel. The gasket mold was microfabricated using SU-8 (SU-8 2025, available from DuPont) photolithography which created highly accurate definition of PDMS sidewalls and channel height. SU-8 was spun onto a silicon wafer and prebaked. Recommended procedures were used to for spinning and development of SU-8, according to the respective layer thickness. Several gasket molds were created with thicknesses spanning 50 to 80 µm.

To form the gasket, a small amount of uncured PDMS was added by applicator into the mold, squeegeed using a sharply-cut thin rubber square, and baked at 60° C. for 60 minutes. The PDMS gasket formed an interior rectangular channel which was 2700 µm×300 µm and approximately 65 µm thick. The longest cantilever (320 µm) was removed because it was slightly longer than the width of the channel (300 µm). The length of the channel formed by the gasket was chosen to span the width of the cantilever die as well as the inlet and outlet ports. The thickness of the gasket was designed so that the bottom of the gasket, which contacts the sample surface, is closely aligned to the freestanding cantilever tip. This ensured that minimal gasket compression is required before the tip contacted the sample surface during operation.

A suite of gaskets were made with varying thicknesses which achieving the precise offset between the probe tip and the gasket. The offset was measured using optical microscopy for each liquid cell. PDMS gaskets were formed with thicknesses ranging from 50 µm to 80 µm in increments of 10 µm and were selected for each liquid cell to be within +/−5 µm of the probe tip and aligned to the cantilever under a microscope. The gasket was then bonded with a small amount of PDMS for a tight seal. The assembled liquid cell could now be inverted and pressed against a flat surface so that the gasket enclosed the cantilevers. For well controlled flow, a syringe pump (available from Harvard Apparatus) was used.

AFM operation was characterized with the microfluidic liquid cell by completing force-distance curves, which are also used to determine cantilever displacement sensitivity. In a force-distance curve measurement, the cantilever deflection is recorded as the sample surface is raised and lowered slightly such that the tip briefly makes contact with the surface, deflects up, and then is drawn out of contact. Data from this measurement were collected on a Veeco MultiMode AFM with NanoScope Ma controller. The trace during retraction was recorded. In the experiment, the liquid cell was sealed against a flat glass surface and deionized (DI) water was applied with a syringe. The gasket was compressed by the glass sample with a computer controlled stepper motor until deflection was recorded. The amount of compression of the gasket necessary for the tip to make contact varied from device to device, but in general occurred within 5 microns. A z-axis piezotube actuator was used for accurate and linear motion. A vertical range of 4 microns was used during the force curves. The cantilever was indented 2 microns and then retracted until the cantilever was no longer touching the surface.

A second demonstration of AFM operation with the microfluidic liquid cell was imaging in an aqueous environment. For this measurement, a silicon calibration grating with a one dimensional array of triangular steps having a precise linear and angular dimensions defined by the Silicon <111> crystal planes (TGG01 Grating, available from MikroMasch) was used. Images were taken in contact mode and scanned 10 µm by 3 um. For these measurements, the rough surface of the sample prohibited a water-tight seal, and therefore no flow-through measurements were made.

Another characterization of AFM operation with the microfluidic liquid cell was an analysis of the liquid cell's low Reynolds number laminar flow. This was done through a series of time lapse still frames taken from a video recorded with a 20× objective magnification. The video was acquired with a Nikon Ti-E inverted microscope with brightfield transmission illumination. In this example, the liquid cell was engaged against a flat PDMS sample surface under a slightly compressive force. Although AFM imaging was not performed simultaneously with flow in this example, the applied pressure could be modulated and the cantilever deflection recorded by visual inspection. Pressure driven flow from a syringe was created and small 4 um microbeads (available from Bangs Labs) were suspended in the DI water to aid in flow visualization. In the time lapse images at 15 frames per second, beads travel at a speed of 0 to 500 um/s. The upper value corresponds to a volume flow rate of ~10 nL/s.

There are several areas where this device may prove useful and potentially transformative. Atomic force microscopy has become a vital tool in the study of molecular dynamics of biomineralization. However, quantification of kinetics and thermodynamics of protein adsorption to crystal surfaces requires a constant flow of protein to replenish the depletion layer and overcome mass transport limitations. Modification to commercial fluid cell designs can provide a simpler geometry that allows calculation of flow conditions. Videos taken of liquid flow reveal a laminar flow that is not obstructed by the probe die, as occurs in typical existing designs.

The Reynolds number calculation is estimated from the following equation:

$$Re = \frac{\rho v D_C}{\mu}$$

with the following values for water density $\rho \sim 1$ g/cm$^3$, velocity $v \sim 500$ µm/s, viscosity $\mu \sim 1$ mPa·s, and $$D_C = \frac{2wh}{w+h} \sim 107 \text{ µm},$$

resulting in a Re~0.05. Computational fluid dynamics simulations of a Veeco fluid cell with a similar flow velocity calculate a Re~15. A conservative shear rate of 10 Hz was demonstrated; however, higher shear rates are certainly possible. Importantly for applications requiring high shear rates, the microfluidic cell disclosed herein can also operate at flow velocities 300 times greater and still achieve similar laminar flow of traditional liquid cells.

The calculated volume enclosed by the channel is ~50 nL. The reduced volume of the flow cell may allow AFM visualization of very precious samples at high concentration, for example in experiments of in situ or ex vivo binding of soluble proteins to surfaces. Therefore, experiments involving the constant flow of protein can be recorded for 3 orders of magnitude longer imaging times, or alternatively at much higher protein concentrations, than the same experiment conducted on a traditional liquid cell. The real time visualization of crystal growth can also substantially benefit from a microfluidic liquid cell as the efficiency of crystal growth is enhanced by confined liquid environments due to the suppression of natural convection resulting from the drastic decreases of the Grashof number.

This design has been used to record force-distance curves as well as to obtain high resolution contact mode images—both critical demonstrations of AFM capability. The volume encapsulated by the fluid cell is below 50 nL and further reduction in liquid volume may be achieved. This design succinctly combines batch-fabricated micro-cantilevers with batch-fabricated microfluidic channels.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A microfluidic cell, comprising:
   a. a compressible block, including a first horizontal surface, an opposite second horizontal surface and a plurality of vertical surfaces therebetween, a gasket structure depending downwardly from the second horizontal surface, the gasket structure defining an open cavity therein, the compressible block defining a fluid inlet passage and a fluid outlet passage each in fluid communication with the cavity and opening to a selected one of the first horizontal surface and one of the plurality of vertical surfaces; and
   b. a cantilever including a body portion and a beam extending laterally therefrom, the body portion embedded in the compressible block and a portion of the beam extending into the cavity defined by the gasket structure.

2. The microfluidic cell of claim 1, wherein the compressible block comprises a polymer.

3. The microfluidic cell of claim 2, wherein the polymer comprises a gas permeable polymer.

4. The microfluidic cell of claim 3, wherein the gas permeable polymer comprises poly(dimethylsiloxane).

5. The microfluidic cell of claim 1, wherein the compressible block comprises a material that is transparent to a preselected wavelength of electromagnetic energy.

6. The microfluidic cell of claim 1, wherein the cantilever further comprises a probe extending downwardly from a distal end of the beam.

7. The microfluidic cell of claim 1, wherein the preselected wavelength comprises a wavelength selected to illuminate a surface of the cantilever by an atomic force microscopy apparatus.

8. The microfluidic cell of claim 1, wherein the compressible block comprises a unitary piece of a material.

9. The microfluidic cell of claim 1, wherein the compressible block comprises:

a. a first layer having a first side that defines an indentation configured to receive a first portion of the cantilever therein;
b. a second layer disposed on the first side of the first layer and embedding a second portion of the cantilever, the second portion of the cantilever; and
c. a gasket layer disposed on a second side of the second layer, the gasket layer defining the gasket structure.

10. The microfluidic cell of claim 9, wherein each of the first layer, the second layer and the gasket layer comprise a polymer.

11. The microfluidic cell of claim 10, wherein the polymer comprises a gas permeable polymer.

12. The microfluidic cell of claim 11, wherein the gas permeable polymer comprises poly(dimethylsiloxane).

13. The microfluidic cell of claim 1, further comprising an imaging surface against which the gasket structure is disposed so that the cavity forms a sample chamber.

14. The microfluidic cell of claim 13, wherein the imaging surface comprises a material to be imaged.

15. A microfluidic cell, comprising:
a. a compressible block comprising a gas permeable polymer and including a first horizontal surface and an opposite second horizontal surface and a plurality of vertical surfaces therebetween, a gasket structure depending downwardly from the second horizontal surface, the gasket structure defining an open cavity therein, the compressible block defining a fluid inlet passage and a fluid outlet passage each in fluid communication with the cavity and opening to a selected one of the first horizontal surface and one of the plurality of vertical surfaces, the gas permeable polymer comprising a material that is transparent to a preselected wavelength of electromagnetic energy selected to illuminate a surface of the cantilever by an atomic force microscopy apparatus; and
b. a cantilever including a body portion and a beam extending laterally therefrom, the body portion embedded in the compressible block and a portion of the beam extending into the cavity defined by the gasket structure.

16. The microfluidic cell of claim 15, wherein the cantilever further comprises a probe extending downwardly from a distal end of the beam.

17. The microfluidic cell of claim 15, wherein the gas permeable polymer comprises poly(dimethylsiloxane).

18. The microfluidic cell of claim 15, wherein the compressible block comprises a unitary piece of a material.

19. The microfluidic cell of claim 15, wherein the compressible block comprises:
a. a first layer having a first side that defines an indentation configured to receive a first portion of the cantilever therein;
b. a second layer disposed on the first side of the first layer and embedding a second portion of the cantilever, the second portion of the cantilever; and
c. a gasket layer disposed on a second side of the second layer, the gasket layer defining the gasket structure.

20. The microfluidic cell of claim 15, further comprising an imaging surface, that includes a material to be imaged, against which the gasket structure is disposed so that the cavity forms a sample chamber.

21. A method of making a microfluidic cell, comprising the steps of:
a. placing a gas permeable polymer into a mold that defines a void that is complimentary in shape to a compressible block including a first horizontal surface and an opposite second horizontal surface and a plurality of vertical surfaces therebetween, a gasket structure depending downwardly from the second horizontal surface, the gasket structure defining an open cavity therein, the compressible block defining a fluid inlet passage and a fluid outlet passage each in fluid communication with the cavity and opening to a selected one of the first horizontal surface and one of the plurality of vertical surfaces;
b. removing the flexible polymer from the mold so as to define the compressible block; and
c. inserting a cantilever into the compressible block, including a body portion and a beam extending laterally therefrom, so that the body portion is embedded in the compressible block and a portion of the beam extends into the cavity defined by the gasket structure.

22. The method of claim 21, wherein the polymer comprises poly(dimethylsiloxane).

23. The method of claim 21, further comprising the step of placing the gasket structure against an imaging surface so as to seal the gasket structure to the imaging surface.

* * * * *